Figure 1:
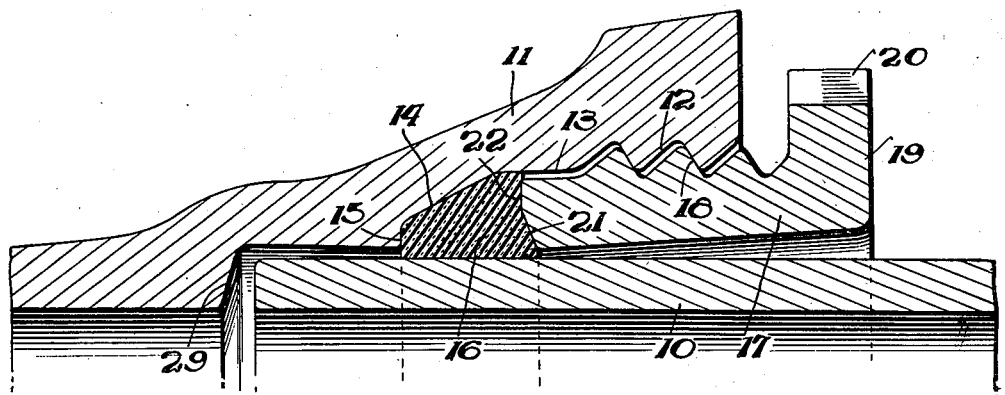

May 12, 1942.  W. D. MOORE  2,282,738

SCREW GLAND JOINT

Filed June 10, 1940

Inventor
William D. Moore.
By Cameron, Kerkam + Sutton
Attorneys

Patented May 12, 1942

2,282,738

UNITED STATES PATENT OFFICE 2,282,738

SCREW GLAND JOINT

William D. Moore, Birmingham, Ala., assignor to American Cast Iron Pipe Company, Birmingham, Ala., a corporation of Georgia Application June 10, 1940, Serial No. 339,778

3 Claims. (Cl. 285—166)

This invention relates to screw gland joints for pipes and, more particularly, to a joint of the type referred to which, while capable of other uses, is of particular utility for use with cast iron piping.

It is an object of this invention to provide an improved pipe joint of the type employing a threaded gland which is of particular utility when used in conjunction with high pressure fluids, although also available for use with low pressure fluids.

Various forms of pipe joints have been proposed utilizing a rubber or other comparable gasket of wedge or tapered formation adapted to be forced into the inner extremity of a bell socket by means of a threaded gland ring. Various expedients have also been proposed for exerting pressure on the gasket to deform the same in various ways and to various extents to effect a gripping contact of the gasket with the bell and spigot-end surfaces. It has also been proposed in Moore Patent No. 1,365,530 dated January 11, 1921, to provide a pipe joint of the type using a bolted gland ring in which a fluid-tight contact between the gasket and the spigot end is assured by deforming a gasket between an inner shoulder in the bell cavity and an outer inwardly inclined metallic member. Such a construction possesses known advantages when used with the bolted type of gland ring, but the frictional opposition to relative movement when a gland ring of the threaded type is employed has been such that, so far as I am aware, the advantages heretofore obtained by the use of such a construction have not been available when a threaded gland ring is used. It is an object of this invention to improve pipe joints of the type employing threaded gland rings so as to take advantage of the type of construction just above referred to.

Another object of this invention is to provide an improved screw gland joint of the type characterized which assures a durable fluid-tight joint notwithstanding relative expansion and contraction of the elements and notwithstanding substantial deflections in the pipe line.

Another object of this invention is to provide an improved screw gland joint of the type characterized which is so constructed as to reduce friction between the gasket and the gland ring and thereby enable a tighter seal to be effected between the gasket and its associated parts with the same expenditure of energy.

Another object of this invention is to provide an improved screw gland joint of the type characterized which assures a better sealing contact between the gasket and the spigot end notwithstanding the use of a threaded gland ring.

Another object of this invention is to provide an improved screw gland joint which is highly efficient, particularly simple in construction, easy to assemble, and durable in service.

Other objects of the invention will appear as the description of the invention proceeds.

The invention is capable of receiving a variety of expressions, two of which are illustrated on the accompanying drawing. But it is to be expressly understood that the drawing is for purpose of illustration only and is not to be construed as a definition of the invention, reference being had to the appended claims for that purpose.

Figures 2, 3:
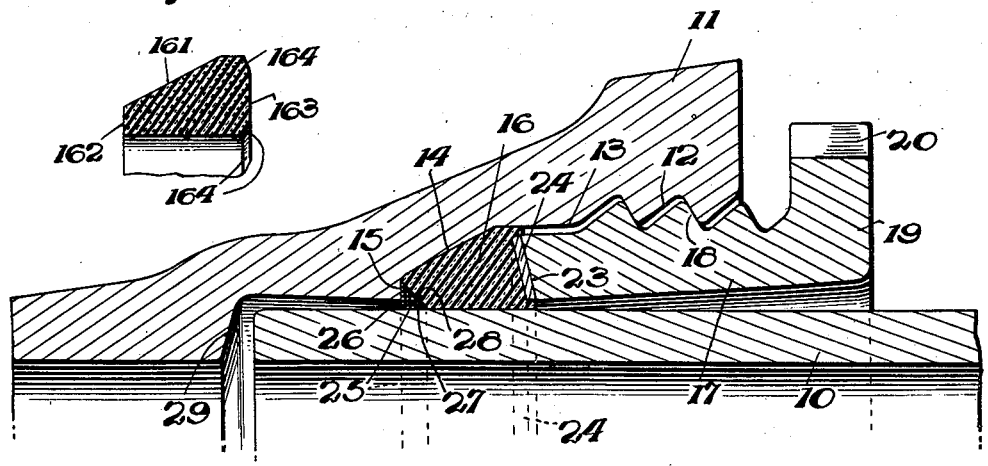

Referring in detail to the accompanying drawing, wherein the same reference characters are employed to designate corresponding parts in the respective figures, Fig. 1 is a fragmentary longitudinal section through one form of screw gland joint embodying the present invention;

Fig. 2 is a corresponding view of another embodiment of the present invention; and Fig. 3 is a sectional view of the preferred form of gasket before application to the joint.

Referring first to Fig. 1, 10 designates the spigot-end and 11 the bell-end members of adjoining sections of pipe of any suitable construction, size, material, etc. The socket of the bell is interiorly provided adjacent its outer end with relatively coarse threads 12, preferably of generally V-shaped cross section, to receive a threaded gland ring as hereinafter referred to. The threads on both the socket and the gland ring are preferably cast to size. Inwardly of said threads 12 the socket of the bell is provided with an axially extending surface 13 of any suitable length, said surface preferably being substantially cylindrical and approximately one-half inch in length, although it may be somewhat inclined inwardly if desired, and also varied as to its length. Inwardly of said surface 13 the socket has a tapered surface 14 which makes a substantial angle with the axis of the socket, said angle preferably being on the order of 28° or less, and said tapered surface 14 terminates in end surface 15 which preferably is at approximately a right angle to the axis, although said surface 15 may incline a few degrees toward the mouth of the bell if desired. Surface 15 is of substantial extent radially, thus constituting a shoulder at the inner end of the bell socket which is large as compared with the clearance between the bell and spigot, as is clearly shown on the drawing, and surface 15 is preferably joined to the surface 14 by a smoothly curved fillet.

Disposed in the space defined by the surfaces 14 and 15 of the spigot end 10 is a gasket 16 of rubber or any other suitable gasket material that is deformable but substantially incompressible under the pressure applied thereto by the gland ring next to be described. Preferably the gasket is made in the form of an annulus having a tapered peripheral surface 161 (Fig. 3) whose angle to the axis is substantially the same as the corresponding angle of surface 14, and end surfaces 162 and 163 which by preference are substantially at a right angle to the axis of the gasket. End surface 163 is beveled at its inner and outer extremities as shown at 164 for a reason to be explained.

The gland ring 17 is provided at its peripheral surface with threads 18 adapted to coact with the threads 12 in the socket, said gland ring preferably terminating at its outer end in a flange 19 which may be provided with any suitable projections or recesses, as indicated at 20, for the application of a tool to effect threading of the gland ring 17 into the bell socket 11. In conformity with the present invention as exemplified by the embodiment of Fig. 1, the inner face of the gland ring 17 is provided with a beveled surface 21 and a second surface 22 at an angle to said surface 21 and preferably approximating a right angle to the axis of the gland ring 17. To press the gasket 16 inwardly against the spigot end 10, in conformity with the present invention, the gland ring 17 has at least a part of the active face at its inner extremity inclined inwardly from its inner edge toward the inner end of the socket as shown at 21. Thereby said inclined surface 21 not only presses the gasket inwardly into the socket as the gland ring is tightened to force the gasket against the shouldered surface 15 but it also deforms the gasket in a direction to cause it to grip the peripheral surface of the spigot end. Thus by the coaction of the shoulder 15 at the inner extremity of the socket with the inclined surface 21 of the gland ring the gasket is forced to tightly fill the inner end of the socket and also forced by the component of the pressure applied by the inclined surface 21 on the gland ring to grip the peripheral surface of the spigot end of the pipe along a zone at the outer edge of the gasket where in prior constructions the action of the gland ring on the gasket has tended to release the grip if not actually deform the gasket out of contact with the spigot end. The coaction of the inclined surfaces 14 and 161 also causes the gasket to be pressed tightly against the exterior surface of the spigot end as the gasket is forced into the socket by the gland ring, so that with the tight seals effected at the shoulder 15 and by the inclined surface 21 on the gland ring acting on the outer face of the gasket a fluid-tight seal is effected that is particularly efficacious in preventing leakage between the gasket and the periphery of the spigot end even under high pressures.

As the gland ring is tightened the reaction between the gland ring and the bell socket causes the threads on the gland ring to abut tightly against the outer sides of each V-shaped thread as is shown with some exaggeration in the drawing. This reaction between the threads squares the gland ring with respect to the socket. As the gland ring approaches its innermost position and deforms the gasket, resistance to rotation of the gland ring rapidly increases because of friction between the inner end of the gland ring and the end surface of the gasket, and this friction is accentuated by the pressure set up by the forwardly inclined surface 21 of the gland ring tending to distort and press inwardly the outer extremity of the gasket. While the threads of the gland ring and socket may be and preferably are well lubricated, the lubricant also tending to prevent admission of moisture with its tendency to cause corrosion, and lubricant may also be interposed between the end face of the gland ring and the end face of the gasket, this resistance to relative rotation may increase to a point where without undue effort further rotation of the gland ring is prevented although the desired pressure has not yet been applied to the gasket.

In conformity with the present invention, however, this resistance to relative rotation has been materially decreased, without foregoing the advantages obtained by forwardly inclining the end surface of the gland ring at 21 to press the gasket material tightly against the spigot end, by forming the end surface of the gland ring, as shown at 22, so that a substantial part thereof will be at an angle to the surface 21 and preferably approximately at a right angle to the axis of the gland ring, and also by beveling the end face of the gasket at 164. The radial extent of the surface 22 may be varied depending upon the size and character of the pipe joint being formed, but I preferably make this surface 22 on the order of 40% to 50% of the radial extent of the end surface of the gland ring 17. The beveled extremities 164 at the end face of the gasket materially reduce any tendency of the gasket material to be deformed into any space existing between the gland ring and the socket or the spigot end or both and thereby, by jamming, to resist and retard the tightening of the gland ring. I have also discovered that if the inner diameter of the gasket 16 is made approximately 5% smaller than the outer diameter of the spigot end, so that when applied the gasket is stretched and grips the spigot end, the friction of the gland ring on the gasket is further reduced because the tendency of the gasket to bulge and resist the movement of the gland ring is materially reduced. A ring of suitable material may also be interposed between the end surface of the gasket and the end face of the gland ring as will appear from the following discussion of Fig. 2. With the gasket and gland ring so formed, and particularly if a lubricant is also used, the gland ring may be readily tightened without undue expenditure of effort to obtain the desired deformation and gripping contact of the gasket 16.

At least some of the advantages of the present invention may be obtained by making the inner face of the gland ring 17 forwardly inclined throughout its radial extent, as shown at 23 in Fig. 2, and interposing between the gasket 16 and said face 23 a relatively thin metal ring 24, which is preferably inclined with respect to the axis of the socket to the same extent as the face 23, so that in applying the gland ring the metal ring 24 will make face-to-face contact with the end of the gland ring because of their like inclination. However, if said ring 24 is sufficiently thin and flexible it will quickly deform into face-to-face contact with the end face of the gland ring 17 even though when unstressed it lack precise conformity with the end face of gland ring 17. Particularly if a lubricant is interposed between the contacting faces of the ring 24 and the gland ring 17, friction is reduced sufficiently so that the gland ring may be tightened to obtain the desired deformation of the gasket 16 without undue expenditure of effort, while at the same time the pressing of the gland material into fluid-tight engagement with the periphery of the spigot end is still effected by the forwardly inclined surface through which the pressure of the gland ring is applied to the gasket. I am aware that it has heretofore been proposed to employ metal rings for reducing friction between a threaded gland ring and a gasket, but so far as I am aware these rings have always been disposed with their surfaces at right angles to the axis of the socket so that in reducing friction through their use no component of force for pressing the gasket against the spigot end has been available.

The generally cylindrical surface 13 provides a chamber in which may be disposed a second gasket, of rubber, lead, or any other suitable material, if and when it becomes desirable to prevent leakage by a supplemental gasket, or to protect the gasket 16 from seepage into the joint from the soil in underground piping, etc.

Another feature of the present invention is concerned with the provision of means at the inner extremity of the gasket for preventing the fluid in the pipe from contacting the material of the gasket. I am aware that it has heretofore been proposed to provide the gasket itself, in various ways, with a liner or tip portion composed of a suitable material which will be unaffected by the fluid in the pipe for the purpose of preventing contact of said fluid with the material of the gasket proper. Gaskets of this type are relatively expensive to produce because the liner or other protective material must be molded into the gasket proper.

In accordance with the present invention a separate ring 25 which is triangular in cross section is formed of the protective material, such as lead, in any suitable way, as by casting, extrusion, etc. Two of the surfaces of said ring, i. e., those designated 26 and 27, are preferably at a substantially right angle with respect to each other, while the third surface 28 constitutes a hypotenuse as shown. The gasket proper is preferably made of the same shape and size as above described whether the ring 25 is to be used or not, as this facilitates standardization of the joint to the end that the same gasket may be used either with or without the ring 25. However, if preferred, the gasket may have its inner face beveled off to substantially conform with the surface 28. In either event, whether initially so formed or arrived at by deformation of the gasket 16 under the pressure of the gland ring 17, the inner face of the gasket 16 will coact with the surface 28 of the ring 25 so as to press said ring 25 both against the shoulder 15 and also inwardly against the exterior surface of the spigot end, completely sealing the joint at the inner extremity of the gasket to prevent access of the fluid in the pipe to the material of the gasket 16.

It will therefore be perceived that by the present invention an improved pipe joint using a threaded gland ring has been provided whereby the gasket may be pressed between a shoulder and an axially inclined surface into gripping contact with the periphery of the spigot end, while at the same time the friction between the gasket and the gland ring has been so reduced that full advantage may be taken of the aforesaid pressing of the gasket into gripping contact with the spigot end without requiring that an undue effort be exerted on said gland ring. Further, by the present invention means have been provided for protecting the gasket material from contact with the fluid contained in the pipe while taking advantage of the gripping contact effected through use of pressure on the gasket between a shoulder and an inclined surface reacting with the gasket and a material saving in the cost of the gasket construction has also been obtained. At the same time the present invention provides a strong, durable pipe joint that is particularly simple in construction, being composed of relatively few parts that are easy to assemble, and the joint effected thereby is highly efficient in preventing leakage and therefore particularly useful in high pressure work.

While the embodiments of the present invention have been illustrated and described with considerable particularity, it is to be expressly understood that the invention is not restricted thereto as the invention is capable of receiving other expressions, as will now be apparent to those skilled in the art, while changes may be made in the details of construction, material, proportion of parts, etc., without departing from the present invention. Certain features may be used without other features, as heretofore explained, and the joint of the present invention may be used in various forms and constructions of bell and spigot ends. Thus the drawing shows the bell end as socketed at 29 to receive the inner extremity of the spigot end according to one well-known type of construction, but the spigot end may be received within the bore of the pipe according to another well-known construction, or the spigot end may be provided with a bead to prevent endwise movement of the pipe sections, etc. It will be apparent that a wide variety of other bell and spigot-end constructions than those here specifically referred to may also be used. Also within the broader aspects of this invention the gasket may be modified in shape or structure or both, as for example as taught in the application of Walter J. Morgan, Serial No. 227,841, filed August 31, 1938, provided the principle of the present invention is not departed from. Reference is therefore to be had to the appended claims for a definition of this invention.

What is claimed is:

1. A screw gland joint structure comprising a bell member, a spigot member entering the bell member, said bell member providing a socket encircling the spigot member to define a gasket chamber, said gasket chamber having a peripheral wall inwardly inclined toward its inner extremity and a shoulder at said extremity extending at approximately a right angle to the axis of said socket with a surface which in a radial direction is large as compared with the clearance between said bell member and said spigot member, a tapered annular gasket having an inner end surface abutted against said shoulder and an outer end surface making a large angle with the axis of said socket, the outer extremity of said bell socket being provided with internal threads, and a gland ring provided with external threads received in said first-named threads, the inner extremity of said gland ring having its inner end surface composed of two angularly related faces both in contact with said gasket, one of said end faces being inclined with respect to the axis of said ring and reacting with the end surface of said gasket to press said gasket radially against the exterior surface of said spigot member.

2. A screw gland joint structure comprising a bell member, a spigot member entering the bell member, said bell member providing a socket encircling the spigot member to define a gasket chamber, said gasket chamber having a peripheral wall inwardly inclined toward its inner extremity and a shoulder at said extremity extending at a large angle to the axis of said socket with a surface which in a radial direction is large as compared with the clearance between said bell member and said spigot member, a tapered annular gasket having an inner end surface abutted against said shoulder and an outer end surface making a large angle with the axis of said socket, the outer extremity of said bell socket being provided with internal threads, and a gland ring provided with external threads received in said first-named threads, the inner extremity of said gland ring having its inner end surface composed of two angularly related faces both in contact with said gasket, one of said end faces being inclined to the axis of said ring and reacting with the end surface of said gasket to press said gasket radially against the exterior surface of said spigot member, and means carried by the face of said gasket in contact with said gland ring for reducing friction therebetween when said gland ring is rotated in contact with said gasket to apply pressure thereto.

3. A screw gland joint structure comprising a bell member, a spigot member entering the bell member, said bell member providing a socket encircling the spigot member to define a gasket chamber, said gasket chamber having a peripheral wall inwardly inclined toward its inner extremity and a shoulder at said extremity extending at a large angle to the axis of said socket with a surface which in a radial direction is large as compared with the clearance between said bell member and said spigot member, a tapered annular gasket having an inner end surface abutted against said shoulder and an outer end surface making a large angle with the axis of said socket, the outer extremity of said bell socket being provided with internal threads, and a gland ring provided with external threads received in said first-named threads, the inner extremity of said gland ring having its inner end surface composed of two angularly related faces both in contact with said gasket, one of said end faces being inclined with respect to the axis of said ring toward the inner end of the bell socket and reacting with the end surface of said gasket to press said gasket radially against the exterior surface of said spigot member.

WILLIAM D. MOORE.